US012359798B2

(12) United States Patent
Frazier

(10) Patent No.: US 12,359,798 B2
(45) Date of Patent: Jul. 15, 2025

(54) TACTICAL FLASHLIGHT ACCESSORIES

(71) Applicant: Andrew Frazier, Sunnyvale, CA (US)

(72) Inventor: Andrew Frazier, Sunnyvale, CA (US)

( * ) Notice: Subject to any disclaimer, the term of this patent is extended or adjusted under 35 U.S.C. 154(b) by 0 days.

(21) Appl. No.: 18/625,146

(22) Filed: Apr. 2, 2024

(65) Prior Publication Data

US 2024/0328611 A1 Oct. 3, 2024

Related U.S. Application Data

(60) Provisional application No. 63/493,759, filed on Apr. 2, 2023.

(51) Int. Cl.

| | |
|---|---|
| ***F21V 21/14*** | (2006.01) |
| ***F21L 4/00*** | (2006.01) |
| ***F21V 17/06*** | (2006.01) |
| ***F21V 21/088*** | (2006.01) |
| ***F21V 21/40*** | (2006.01) |
| *F21W 111/10* | (2006.01) |

(52) U.S. Cl.

CPC ............ *F21V 21/145* (2013.01); *F21L 4/005* (2013.01); *F21V 17/06* (2013.01); *F21V 21/0885* (2013.01); *F21V 21/406* (2013.01); *F21W 2111/10* (2013.01)

(58) Field of Classification Search

CPC ...... F21V 21/0885; F21V 19/02; F21V 17/10; F21V 33/00; F21L 4/005; F21S 9/02

See application file for complete search history.

(56) References Cited

U.S. PATENT DOCUMENTS

| | | | |
|---|---|---|---|
| 42,146 A | 3/1864 | Sargent | |
| 362,110 A | 5/1887 | Redfield | |
| 362,197 A | 5/1887 | Bennett | |
| 4,758,933 A | 7/1988 | Winberg et al. | |
| 5,040,322 A | 8/1991 | Iturrey, Jr. | |
| 5,642,932 A | 7/1997 | Matthews | |
| 5,816,683 A | 10/1998 | Christiansen | |
| 5,848,834 A | 12/1998 | Kerr | |
| 6,222,138 B1 | 4/2001 | Matthews et al. | |
| 6,641,277 B2 | 11/2003 | Smith | |
| 7,303,306 B2 | 12/2007 | Ross et al. | |
| 7,334,366 B2 | 2/2008 | La France | |
| 7,399,100 B1 | 7/2008 | Plyaskin | |
| 7,722,209 B2 | 5/2010 | Matthews et al. | |
| 7,735,255 B1 | 6/2010 | Kincaid et al. | |
| 7,736,013 B2 | 6/2010 | Griffin | |
| 7,857,480 B2 | 12/2010 | Steele et al. | |
| 8,075,156 B2 | 12/2011 | Steele et al. | |
| 8,087,795 B2 | 1/2012 | D'Amato | |
| 8,985,804 B2 | 3/2015 | Frazier | |
| 10,188,198 B1 * | 1/2019 | Weber | F21L 4/005 |

(Continued)

*Primary Examiner* — Joseph L Williams

(74) *Attorney, Agent, or Firm* — Franklin & Associates International Inc; Matthew F. Lambrinos

(57) ABSTRACT

One more flashlight accessories for a flashlight include a connection collar configured to enclose a tubular body of a flashlight when the connection collar is attached to the flashlight. A finger retention ring is integral with or attached to an exterior of the connection collar. An attachment clip is disposed on a sidewall. The attachment clip is configured to be selectively mounted slideably and/or radially in different positions along the sidewall. The attachment clip may be a pocket clip, pouch clip and/or holster clip.

20 Claims, 12 Drawing Sheets

(56) References Cited

U.S. PATENT DOCUMENTS

| | | | | |
|---|---|---|---|---|
| 11,022,283 | B2 * | 6/2021 | Li | F21V 33/00 |
| 2007/0228754 | A1 | 10/2007 | Rankin | |
| 2009/0009987 | A1 | 1/2009 | Graham | |

* cited by examiner

TACTICAL FLASHLIGHT ACCESSORIES

TECHNICAL FIELD

Embodiments relate generally to a flashlight and/or flashlight accessory.

BACKGROUND

Conventionally, employing a flashlight for searching in darkness by military, law enforcement, and other similar personnel has required deploying the flashlight from a dedicated pocket, pouch or holster, and gripping the body of the flashlight to retain it during use.

Furthermore, flashlights are often carried whilst a user is also engaged in other tasks and/or duties and may benefit from additional capabilities and or functions being provided by the flashlight and/or accessories attached thereto.

SUMMARY

According to one aspect of the present technology, a flashlight accessory for a flashlight is provided. The flashlight accessory may comprise a connection collar comprising a sidewall having an inner surface, wherein the inner surface is substantially cylindrical and configured to enclose a tubular body of a the flashlight when the connection collar is attached to the flashlight. The flashlight accessor y may further comprise a finger retention ring comprising at least one member, wherein the finger retention ring is integral with or attached to an exterior of the sidewall, wherein the finger retention ring integral with or attached to the exterior of the sidewall defines an opening configured to receive a first finger of at user, wherein the central axis of the opening is substantially perpendicular to a central longitudinal axis of the substantially cylindrical inner surface of the connection collar. The flashlight accessory may further comprise an attachment clip disposed on the sidewall spaced apart circumferentially from the finger retention ring, wherein the attachment clip is configured to be slideably mounted in different positions along the sidewall, the attachment clip being configured to be slidable substantially parallel with the central longitudinal axis of the substantially cylindrical inner surface and to be securable in each of the different positions.

The adjustable attachment clip may comprise a distal leg interconnecting a proximal leg, the proximal leg being slidably mounted along the sidewall and configured to be securable in the different positions along the sidewall, and wherein the distal leg and proximal leg are operable to receive and clip therebetween an edge of a layer of material.

The attachment clip may be any one or combination of a pocket attachment clip, pouch attachment clip and a holster attachment clip.

The proximal leg may be slidably mounted in at least one channel disposed along the connection collar sidewall, the at least one channel extending substantially parallel with the central longitudinal axis of the substantially cylindrical inner surface.

The proximal leg may be configured to be slideably friction fit to the at least one channel. The proximal leg may include a protrusion/recess and the at least one channel includes a corresponding recess/protrusion, wherein the protrusion/recess of the proximal leg and the corresponding protrusion/recess of the at least one channel are configured to limit the range of slidable displacement of the proximal leg along the at least one channel.

The at least one channel may have an open end disposed at the upper end of the sidewall, wherein the proximal leg is disposed in the open end, and wherein the distal leg and a portion interconnecting the distal leg and proximal leg are disposed outside the sidewall.

The attachment clip may be configured to slidably translate on the sidewall between an upper vertical position and a lower vertical position, wherein when the attachment clip is in the upper vertical position the proximal leg extends upwardly out from and beyond the open end of the channel and wherein when the attachment clip is in the lower vertical position, the proximal leg is disposed further downward in the channel.

The proximal leg may have a distal end disposed in the channel in a lower region opposite the open end, the lower region being wider than a portion of the channel above the lower region, wherein the protrusion is disposed on the distal end; wherein the protrusion is configured to abut a closed end of the channel opposite the open end when the attachment clip is in the lower vertical position, and abut a top sidewall of the lower region of the channel when the attached clip is in the upper position.

According to another aspect of the present technology, a flashlight accessory comprises connection collar may comprise a sidewall having an inner surface, wherein the inner surface is substantially cylindrical and configured to enclose a tubular body of a the flashlight when the connection collar is attached to the flashlight. The flashlight accessory may further comprise a finger retention ring comprising at least one member, wherein the finger retention ring is integral with or attached to an exterior of the sidewall, wherein the finger retention ring integral with or attached to the sidewall defines an opening configured to receive a first finger of at user, wherein the central axis of the opening is substantially perpendicular to a central longitudinal axis of the substantially cylindrical inner surface of the connection collar;

The flashlight accessory may further comprise a plurality of channels, each channel of the plurality of channels extending substantially in parallel with the central longitudinal axis along the sidewall, the plurality of channels being circumferentially spaced apart and disposed at different radial positions on at least a portion of the sidewall, the portion of the sidewall being spaced apart circumferentially from the finger retention ring.

The flashlight accessory may further comprise a radially adjustable attachment clip, wherein the attachment clip is configured to be releasably mounted to any one or more of the channels of the plurality of channels according to a selected radial position on the sidewall, The adjustable attachment clip may comprise a distal leg interconnecting a proximal leg, the proximal leg being configured to be selectively mounted to any one or more of the channels in a selected radial position, and wherein the distal leg and proximal leg are operable to receive and clip therebetween an edge of a layer of material.

The attachment clip may be any one or combination of a pocket attachment clip, pouch attachment clip and a holster attachment clip.

The proximal leg may be configured to releasably friction fit to the one or more channels in the selected radial position.

The proximal leg may comprise a pair of spaced apart elongated members, wherein the one or more channels comprises a pair of sub channels corresponding to the spaced apart elongated members, and wherein the spaced apart elongated members are releasably mounted in the respective corresponding sub channels. Each of the channels of the plurality of channels may have an open end disposed at the upper end of the sidewall, wherein the proximal leg extends upwardly out from the open end of the one or more channels to which the proximal leg is releasably mounted, and wherein the distal leg and a portion interconnecting the distal leg and proximal leg are disposed outside the sidewall.

The proximal leg may have at least one protrusion/recess configured to releasably engage a corresponding at least one cavity/protrusion in the one more or channels to which the proximal leg is releasably mounted to prevent slidable displacement of the proximal leg in the one or more channels.

According to yet another aspect of the present technology, the flashlight accessory may comprise a connection collar comprising a sidewall having an inner surface, wherein the inner surface is substantially cylindrical and configured to enclose a tubular body of a the flashlight when the connection collar is attached to the flashlight.

The flashlight accessory man be a finger retention ring, wherein the finger retention ring is integral with or attached to an exterior of the connection collar sidewall. The finger retention ring may includes a flexible or semi rigid member and is configured to be adjustable between a ring configuration and a clip configuration, wherein in a ring configuration a distal end of the flexible member opposite an end integrated with or attached to the sidewall is releasably engaged with the sidewall and the flexible member is substantially ring shaped and together with the sidewall defines the opening; wherein the opening is substantially perpendicular to a central longitudinal axis of the substantially cylindrical inner surface of the sidewall; and, wherein in a clip configuration, the distal end is detached and spaced from the sidewall, the sidewall and distal end being configured to receive and clip therebetween an edge of a layer of material.

The flashlight accessory may further comprise a recess in the exterior of the sidewall of the connection collar, and wherein, in the ring configuration, the distal end is configured to engage loosely in the recess. The distal end of the flexible or semi rigid member may be configured to temporarily deflect away from the sidewall when the distal end is released from the recess. The plane occupied by the recess may be offset from the plane occupied by the opposite end of the flexible/semi rigid member, wherein in the ring configuration the flexible member curves between the plane occupied by the opposite end and the plane occupied by the recess and the distal end.

The flashlight accessory of any one of the embodiments described herein may comprises a formed metal wire.

In the flashlight accessory of any one of the embodiments described herein, the finger retention ring may be integrally attached to the upper end of the sidewall and releasably attached to the lower end of the sidewall.

According to some aspects of the present technology, embodiments of a flashlight accessory may comprise: a connection collar to removably attach to a flashlight, wherein the flashlight comprises a tubular body having a longitudinal axis, wherein a distal portion of the flashlight includes a lamp assembly, wherein a proximal portion of the flashlight includes a tail cap switch to activate the flashlight, wherein the connection collar includes a substantially cylindrical inner surface to enclose at least some of the proximal portion of the flashlight; and a finger retention loop comprising and opening configured to accept a first finger of at user, wherein the finger retention loop is substantially proximate to the longitudinal axis of the tubular body, wherein the he finger retention loop is integrally attached to the cylindrical collar; and an attachment clip disposed in a location apart from the finger retention loop, comprised of a proximal end and a distal end, the proximal end having a sliding protrusion oriented perpendicular to the longitudinal axis of the cylindrical collar and engaged in a channel on the cylindrical collar such that the attachment clip can move parallel to the longitudinal axis of the cylindrical collar within a bound range of motion. The finger retention loop may be integrally attached to the proximal end of the cylindrical collar and releasably attached to the substantially distal end of the cylindrical collar.

The attachment clip may be comprised of formed metal wire. In some embodiments, the attachment clip may be formed from metal wire. In some embodiments, the wire may be a wire loop in design. The flashlight accessory may comprise a raised shoulder disposed circumferentially on the inner surface of the connection collar. The flashlight accessory may further comprise a finger ring with a first portion substantially proximate to the longitudinal axis of the tubular body, wherein the first portion of the finger retention loop is integrally attached to the cylindrical collar, wherein the finger rotation loop further comprises a second portion substantially distal to the longitudinal axis of the tubular body, wherein the second portion of the finger rotation loop comprises a protrusion extending outwardly from the finger retention loop in a first direction, wherein the protrusion is configured to, when pressed by the thumb of the user, activate the flashlight by rotating the flashlight accessory around the first finger to apply pressure on the tailcap of the flashlight. The finger retention loop may be offset from the longitudinal axis of the tubular body.

The first direction may be substantially perpendicular to the longitudinal axis of the tubular body. A central axis of the opening of the finger retention loop may be substantially perpendicular to the first direction and the longitudinal axis of the tubular body. A diameter of the inner surface of the connection collar may be greater than a diameter of the tubular body of the flashlight. The connection collar may be to removably attach the flashlight without using a friction fit.

The flashlight accessory may comprise a raised shoulder disposed circumferentially on the inner surface of the connection collar. The flashlight accessory may further comprise a finger ring with a first portion substantially proximate to the longitudinal axis of the tubular body, wherein the first portion of the finger retention loop is integrally attached to the cylindrical collar, wherein the finger rotation loop further comprises a second portion substantially distal to the longitudinal axis of the tubular body, wherein the second portion of the finger rotation loop comprises a protrusion extending outwardly from the finger retention loop in a first direction, wherein the protrusion is configured to, when pressed by the thumb of the user, activate the flashlight by rotating the flashlight accessory around the first finger to apply pressure on the tailcap of the flashlight. The finger retention loop may be offset from the longitudinal axis of the tubular body. The first direction may be substantially perpendicular to the longitudinal axis of the tubular body. A central axis of the opening of the finger retention loop may be substantially perpendicular to the first direction and the longitudinal axis of the tubular body. A diameter of the inner surface of the connection collar may be greater than a diameter of the tubular body of the flashlight. The connection collar may be to removably attach the flashlight without using a friction fit.

According to another aspect of the present technology, a flashlight accessory may comprise a connection collar to removably attach to a flashlight, wherein the flashlight comprises a tubular body having a longitudinal axis, wherein a distal portion of the flashlight includes a lamp assembly, wherein a proximal portion of the flashlight includes a tail cap switch to activate the flashlight, wherein the connection collar includes a substantially cylindrical inner surface to enclose at least some of the proximal portion of the flashlight; and a finger retention loop comprising and opening configured to accept a first finger of at user, wherein the finger retention loop is substantially proximate to the longitudinal axis of the tubular body, wherein the finger retention loop is integrally attached to the cylindrical collar; and an attachment clip with a proximal end having at least one protrusion extending in a direction not parallel with the longitudinal axis of the cylindrical collar, said protrusion(s) is/are temporarily engaged in one of a multitude of receptacle cavities in the wall of the cylindrical collar that are arrayed radially around the cylindrical collar's longitudinal axis. The position of the attachment clip can thus be changed relative to the finger retention loop's position by engaging the attachment clip's protrusions in different receptacle cavities of the cylindrical collar. The finger retention loop may be integrally attached to the proximal end of the cylindrical collar and releasably attached to the substantially distal end of the cylindrical collar.

The attachment clip may be comprised of formed metal wire. The flashlight accessory may further comprise a raised shoulder disposed circumferentially on the inner surface of the connection collar. The flashlight accessory may further comprise a finger ring with a first portion substantially proximate to the longitudinal axis of the tubular body, wherein the first portion of the finger retention loop is integrally attached to the cylindrical collar, wherein the finger rotation loop further comprises a second portion substantially distal to the longitudinal axis of the tubular body, wherein the second portion of the finger rotation loop comprises a protrusion extending outwardly from the finger retention loop in a first direction, wherein the protrusion is configured to, when pressed by the thumb of the user, activate the flashlight by rotating the flashlight accessory around the first finger to apply pressure on the tail cap of the flashlight. The finger retention loop may be offset from the longitudinal axis of the tubular body. The first direction may be substantially perpendicular to the longitudinal axis of the tubular body. A central axis of the opening of the finger rotation loop may be substantially perpendicular to bot the first direction and the longitudinal axis of the tubular body. The flashlight accessory may be a diameter of the inner surface of the connection collar is greater than a diameter of the tubular body of the flashlight. The connection collar may be to removably attach the flashlight without using a friction fit.

According to some aspects of the present technology, a flashlight accessory may comprise a connection collar to removably attach to a flashlight, wherein the flashlight comprises a tubular body having a longitudinal axis, wherein a distal portion of the flashlight includes a lamp assembly, wherein a proximal portion of the flashlight includes a tail cap switch to activate the flashlight, wherein the connection collar includes a substantially cylindrical inner surface to enclose at least some of the proximal portion of the flashlight; and a finger retention loop comprising and opening configured to accept a first finger of at user, wherein the finger retention loop is substantially proximate to the longitudinal axis of the tubular body, wherein the proximal end of the finger retention loop is integrally attached to the cylindrical collar and the distal end of the finger retention loop is a cantilevered member, separate but approximate to the cylindrical collar. The distal end of the finger retention loop may releasably engage a recess on the outer diameter of the cylindrical collar. The distal end of the finger retention loop may be temporarily deflected substantially perpendicularly away from the cylindrical color in order to capture a separate structure such as a clothes pocket between the distal end of the finger retention loop and the cylindrical structure.

BRIEF DESCRIPTION OF THE DRAWINGS

Certain preferred embodiments and modifications thereof will become apparent to those skilled in the art from the detailed description below having reference to the figures that follow. The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

The following disclosure provides embodiments of systems and methods for flashlight accessories capable of providing a functional enhancement or enhancements such as but not limited to, moveable attachment structures, releasable finger retention loops, and other enhancement described herein.

In some approaches of the present technology, at least one flashlight accessory is provided. The flashlight accessory is adapted to attach to a flashlight. In some aspects, the present technology comprises any one of the flashlight accessories shown and described in the accompanying drawings and is not limited to being attached to a flashlight.

In some other approaches of the present technology, at least one flashlight accessory is mounted to a flashlight is provided. In some embodiments, the flashlight may be a flashlight described and shown in the accompanying drawings.

Figure 1:
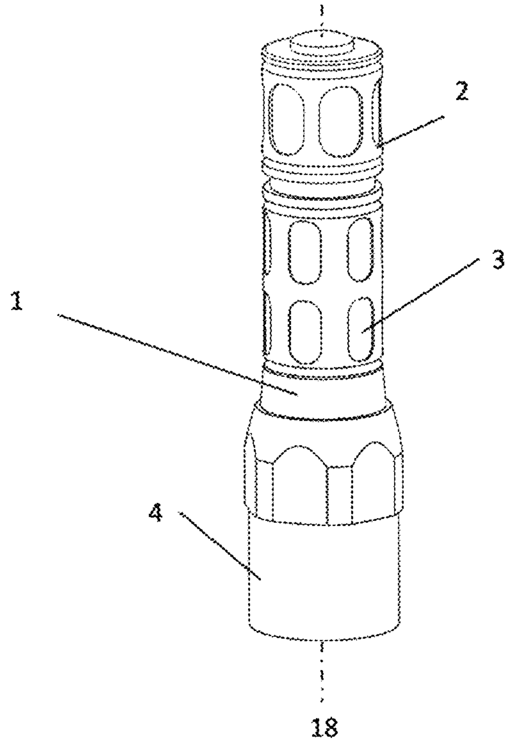
FIG. 1 is a perspective view of a flashlight.

FIG. 1 shows a perspective view of a flashlight 1 compromised principally of a tailcap switch 2, a tubular body 3, and a lamp assembly 4.

In some aspects of the present technology, the following descriptions include flashlight accessories that generally are comprised of a tubular collar for mounting to a flashlight. By way of example, such a flashlight may be but not limited to a flashlight 1 shown in FIG. 1. In some embodiments, the tubular collar may be a base tubular collar adapted to the base of the tubular body of a flashlight. For example, in some embodiments, the tubular collar of the flashlight accessory has protrusions inside the tubular collar that are captured by assembling the flashlight's tail cap switch and tubular body components on either side of the protrusions such that the flashlight accessory is attached to a specific location on the flashlight.

Figure 2:
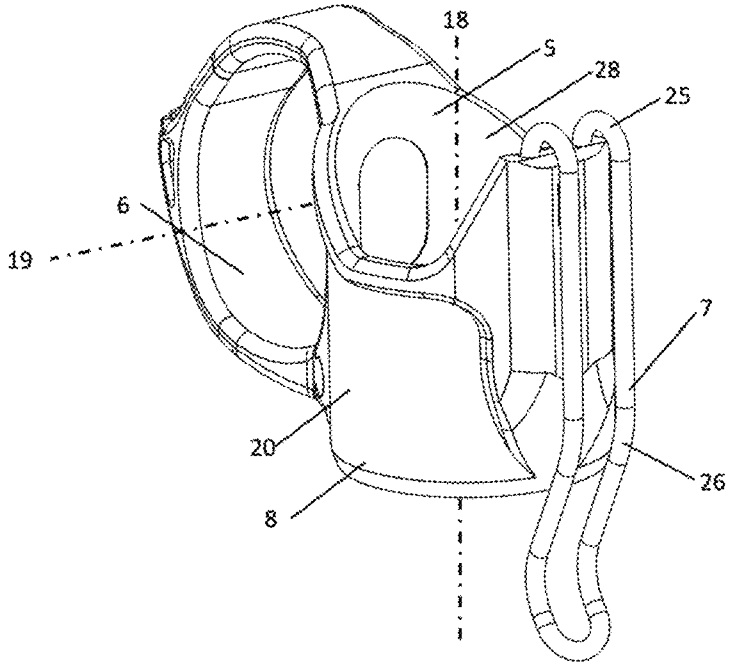
FIG. 2 is a perspective view of a flashlight accessory according to some embodiments.

FIG. 2 shows a perspective exploded view of a flashlight accessory 5 according to one aspect. Flashlight accessory 5 is principally comprised of a finger retention ring 6, an attachment clip 7, and a tubular connection collar 8, the attachment clip 7 may be affixed to a radial location on the flashlight accessory 5 that is opposite the finger ring 6 (as shown in FIG. 2) or in any other radial location that is advantageous to the user. As such the orientation of the attachment clip 7 may be 180 degrees opposed to the finger ring 6. In other embodiments of the invention, the finger retention ring 6 and attachment clip 7 may be at smaller angles around the flashlight accessory, for example, the finger ring 6 may be 90 degrees opposed to the attachment clip 7. In further embodiments the finger ring 6 may be between 10 and 89 degrees opposed to the attachment clip.

In some embodiments, the attachment clip is comprised of metal, but may also be comprised of polymer, wood, or other material known to those skilled in the art. For example, in FIG. 2, the attachment clip comprises metal wire, such as a metal wire loop. Connection collar 8 comprises a sidewall 20 having an inner surface 28, The inner surface 28 is substantially cylindrical and configured to enclose the tubular body 3 of a flashlight when the connection collar 8 is attached to the flashlight. Finger retention ring 6 is made from one or more members. The one or more members form a ring like shape. As shown in FIG. 2, finger retention ring 6 is integral with or attached to an exterior of the sidewall of the connection collar. The finger retention ring member(s) integrated or attached to the exterior of the sidewall 20 forms an opening configured to receive a first finger of at user. The finger retention ring member(s) may be integrated with or attached to the exterior of the connection collar sidewall in different ways to form the opening. A central axis 19 of the opening is substantially perpendicular to a central longitudinal axis 18 of the cylindrical inner surface of connection collar 8.

In some embodiments, the finger retention ring 6 one or more members form a continuous ring attached to the connection collar sidewall 20. In some other embodiments, the finger retention ring 6 one or more members form an incomplete ring with opposing distal ends and a gap therebetween (such as a C shape). In such cases, the finger retention ring member(s) and a portion of the exterior of the sidewall bridge the gap to complete the ring opening.

As will be explained in more detail with reference to FIG. 9, attachment clip 7, which is disposed on the connection collar sidewall 20 and spaced apart circumferentially from the finger retention ring 6, is configured to be selectively slideably mounted in different vertical positions along the connection collar sidewall 20. Attachment clip 7 is configured to be slideably translate substantially parallel with the central longitudinal axis 18 of the substantially cylindrical inner surface 28 and to be securable in each of the different vertical positions.

Figure 9:
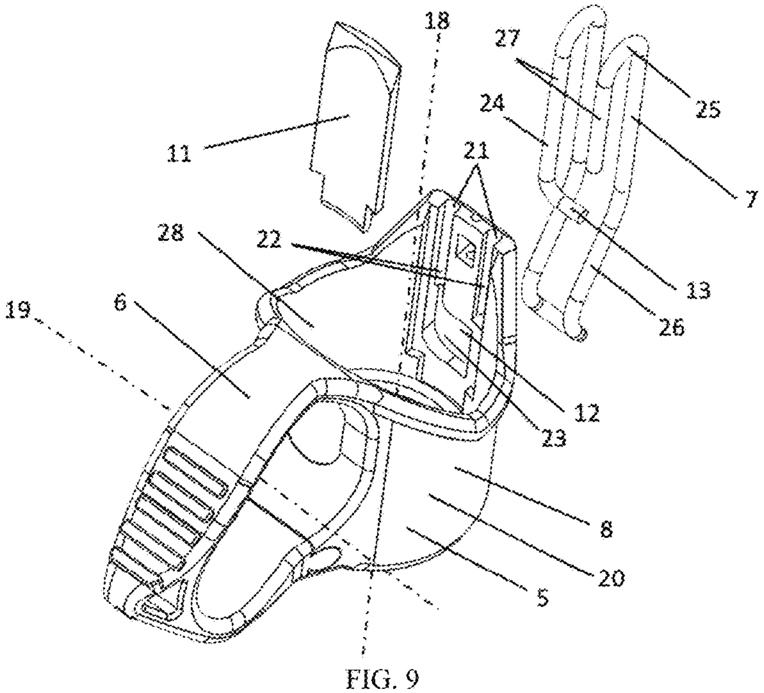
FIG. 9 is an exploded perspective view of a flashlight accessory according to some embodiments.

FIG. 9 shows and exploded perspective view of the flashlight accessory 5 of FIG. 2. In this embodiment, the attachment clip 7 includes an attachment clip protrusion 13 that, when assembled onto the connection collar 8 of the flashlight accessory 5, is positioned to be slideably captured in a clip channel 12 within the connection collar 8. Furthermore, the connection collar 8 is designed such that it can accept a clip channel cover 11 that further captures and protects the sliding mechanism. This configuration of components allows the attachment clip 7 to be adjusted vertically throughout a range of travel that allows the attachment clip 7 to move relative to the sidewall 20 of the flashlight accessory 5 and any attached flashlight. The attachment clip remains in position by virtue of a frictional fit with channel 12.

When the flashlight 1 and flashlight accessory 5 are attached to the opening of a clothes pocket, such as the front pocket of trousers, with the flashlight 3 and flashlight accessory 5 inside the pocket and the attachment clip 7 outside the pocket, the attachment clip's 7 adjustability allows the flashlight to be positioned higher relative to the pocket opening and or lower, relative to the pocket opening.

This feature allows users to adjust the finger retention ring's 6 position to be more or less accessible during daily activities. An additional advantage of this embodiment is that the flashlight 3 and flashlight accessory 5, and especially the finger ring 6 can be positioned to be more or less visible based on whether it is below or partially above the opening up a pocket.

Figures 10A, 10B:
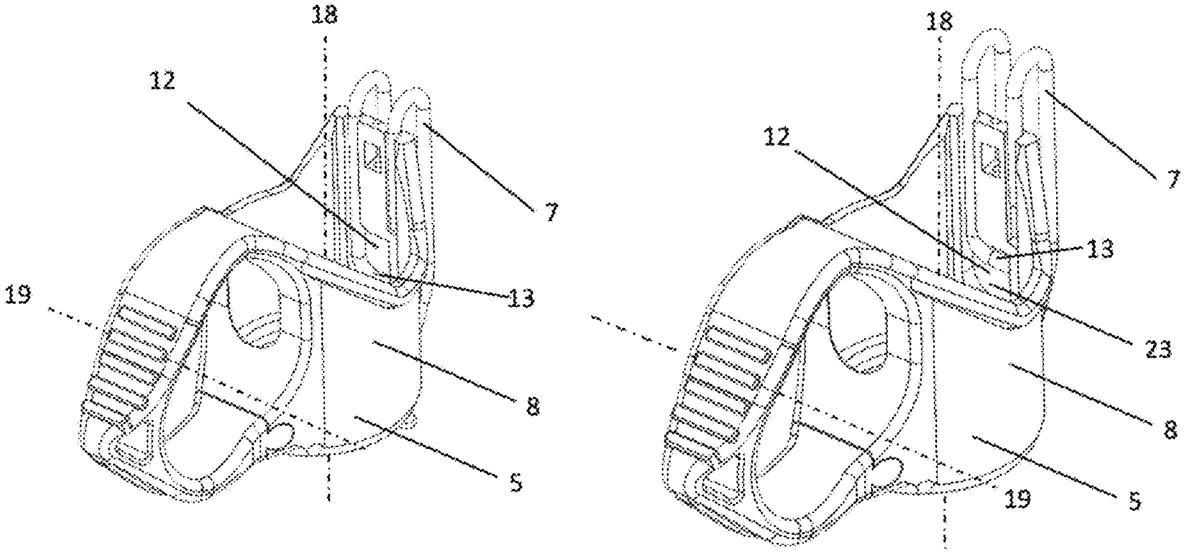
FIG. 10A is a perspective view of a flashlight accessory according to some embodiments.
FIG. 10B is a perspective view of a flashlight accessory according to some embodiments.

FIG. 10A shows a partial perspective view of a flashlight accessory of FIG. 2. The clip channel cover 11 (from previous figures) has been removed in order to show the position of the attachment clip 7 and the attachment clip protrusion 13 in a lower vertical position within the clip channel 12.

FIG. 10B shows a partial perspective view of a flashlight accessory of FIG. 2. The clip channel cover 11 (from previous figures) has been removed in order to show the position of the attachment clip 7 and the attachment clip protrusion 13 in a higher vertical position within the clip channel 12. In some embodiments, multiple attachment clip 7 protrusions are present to provide the slideable movement of the attachment clip 7 relative to the connection collar 8 within a clip channel 12 or multiple clip channels. In still further embodiments, the attachment clip protrusion is replaced with a recess that corresponds to a protrusion in the clip channel 12, thus providing similar limited range of vertical travel of the attachment clip 7 relative to the connection collar 8.

Referring to the adjustable attachment clip 7 in more detail, attachment clip 7 has a distal leg 26 interconnecting a proximal leg 24, the proximal leg being slidably mounted along the connection collar sidewall 20 and configured to be securable in the different positions along the sidewall. The distal leg 26 and proximal leg 24 are operable to receive and clip therebetween an edge of a layer of material of a pocket, holster, pouch or the like. In some embodiments, the attachment clip is any one or combination of a pocket attachment clip, pouch attachment clip and a holster attachment clip.

The proximal leg is slidably mounted in channel 12 disposed along the connection collar sidewall 20. Channel 12 extends substantially parallel with the central longitudinal axis 18 of the substantially cylindrical inner surface 28. In some embodiments, there may be more than one channel 12 to accommodate different attachment clip structures. The channel may have spaced apart portions such as for example shown in FIGS. 9 & 10A in which channel 12 has a pair of spaced apart sub channels 22 extending up from a lower region 23 of the channel to an open end 21 at the top of the connection collar sidewall 20 to accommodate the wire loop structure of the attachment clip. As such, the proximal leg 24 comprises a pair of spaced apart elongated members 27 and the spaced apart elongated members are releasably mounted in the respective corresponding sub channels 22. Proximal leg 24 is configured to be slideably friction fit to the at least one channel. The proximal leg includes protrusion 13 and wherein together the protrusion and channel 12 are configured to limit the range of slidable displacement of the proximal leg 24 along the at least one channel. In FIGS. 10A and 10B this is achieved by the shape of lower region of channel 12 capturing and stopping protrusion 13 from moving above the top wall of the lower region of the channel 23 and the closed end of the lower region of channel 12 stopping protrusion 13 from moving below channel 12.

Channel 12 has an open end 21 disposed at the upper end of the connection collar sidewall 20. The uppermost part of the proximal leg 24 is disposed in the open end 21. The distal leg 26 and a portion interconnecting the distal leg and proximal leg are disposed outside the sidewall. Attachment clip 7 is configured to be slideably engaged on the connection collar sidewall between the upper vertical position and lower vertical position. When the attachment clip is in the upper vertical position the proximal leg extends upwardly out from and beyond the open end of the channel. When the attachment clip is in the lower vertical position, the proximal leg is disposed further downward in the channel than when the attachment clip is in the upper position.

As shown in FIGS. 10A and 10B, the proximal leg 24 has a distal end disposed in channel 12 in the lower region 23 opposite the open end 21 of the channel. The lower region 23 is wider than a portion of the channel above the lower region, Since the protrusion 13 is disposed on the distal end and extends laterally to the direction of displacement of the proximal leg 24 in channel 12, protrusion 13 is configured to abut a closed end of the channel opposite the open end 21 when the attachment clip is moved to the lower vertical position and thereby stop further downward vertical displacement of attachment clip below the lower vertical position. Furthermore, protrusion 13 is configured to abut the top sidewall of the lower region 23 of the channel when the attachment clip is moved to upper vertical position and thereby stop further upward vertical movement of the attachment clip above the upper vertical position.

In other embodiments, the protrusion can be incorporated into the channel and a corresponding recess incorporated into the proximal leg and the protrusion and recess configured to limit slidable displacement of the proximal leg beyond the upper vertical position and/or lower vertical position.

Figures 3A, 3B:
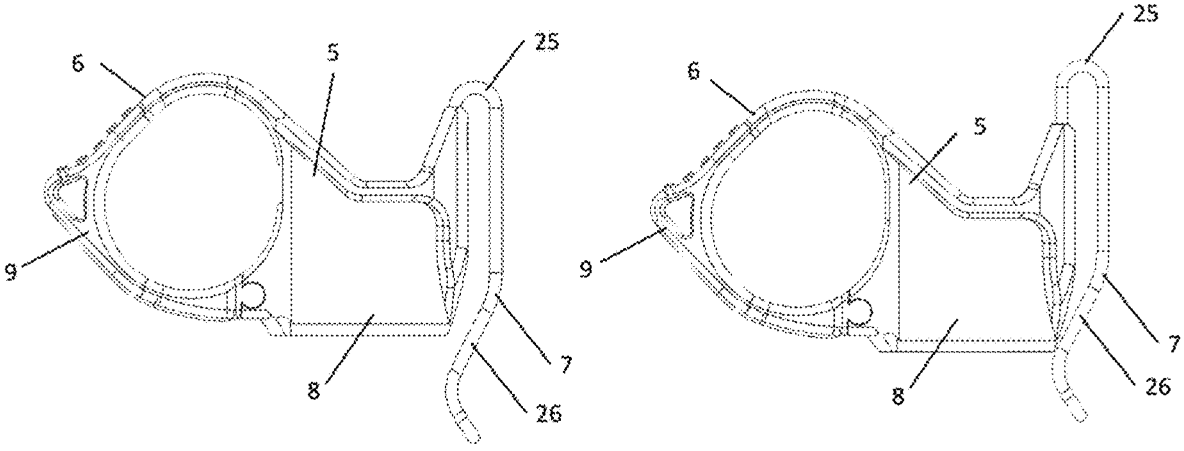
FIG. 3A is a side view of a flashlight accessory according to some embodiments.
FIG. 3B is a side view of a flashlight accessory according to some embodiments.

FIG. 3A further shows a side view of the flashlight accessory of FIG. 2. In this particular configuration the attachment clip 7 is in specific lower vertical position relative to the connection collar 8.

FIG. 3B further shows a side view of the flashlight accessory of FIG. 10B. In this alternate configuration, the attachment clip 7 is in a higher vertical position compared to the configuration shown in FIG. 3A. In some embodiments the vertical position of the clip may move from multiple vertical positions and in other embodiments the attachment clip 7 may be continuously repositionable relative to the connection collar 8 and or the finger ring 6. In still further embodiments, the attachment clip 7 may be fixed in a non-adjustable position. The range of travel within which the adjustment clip may move relative to the tubular connection collar 8 and or the finger ring 6 may be between 3 millimeters and 30 millimeters, and in some embodiments, optimally 7 millimeters.

Figure 4:
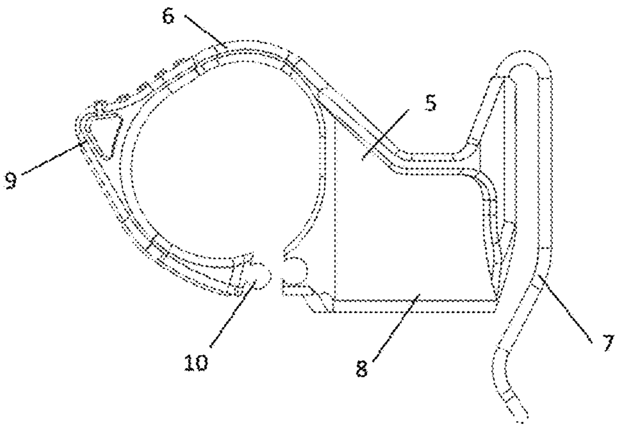
FIG. 4 is a side view of a flashlight accessory according to some embodiments.

FIG. 4 further shows a side view of the flashlight accessory of FIG. 2 with a releasable connector 10 disengaging one end of the finger ring 6 from the connection collar 8. In some embodiments this connector is a flexible mechanical interlocking mechanism created by portions of the finger ring 6 and corresponding portions of the connection collar 8 that allow the finger ring 6 to be attached to the connection collar 8 until a threshold force and or torque is reached, at which point the releasable structures separate. This feature is advantageous in the event a user has their finger within the ring and the flashlight is acted upon by external forces. The releasable connector 10 allows the finger ring 6 to disengage the flashlight from the user to prevent and or limit the potential for injury. In other embodiments the releasable connector 10 may be comprised of magnets or other force limiting mechanisms that allow the ring to separate above a certain threshold. In further embodiments, multiple connection mechanisms of similar or differing types are used to create the releasable connectors' advantages. In still further embodiments, the material and or geometry of the finger ring 6 is selected to permanently break when a certain force and or torque is reached.

Figure 5:
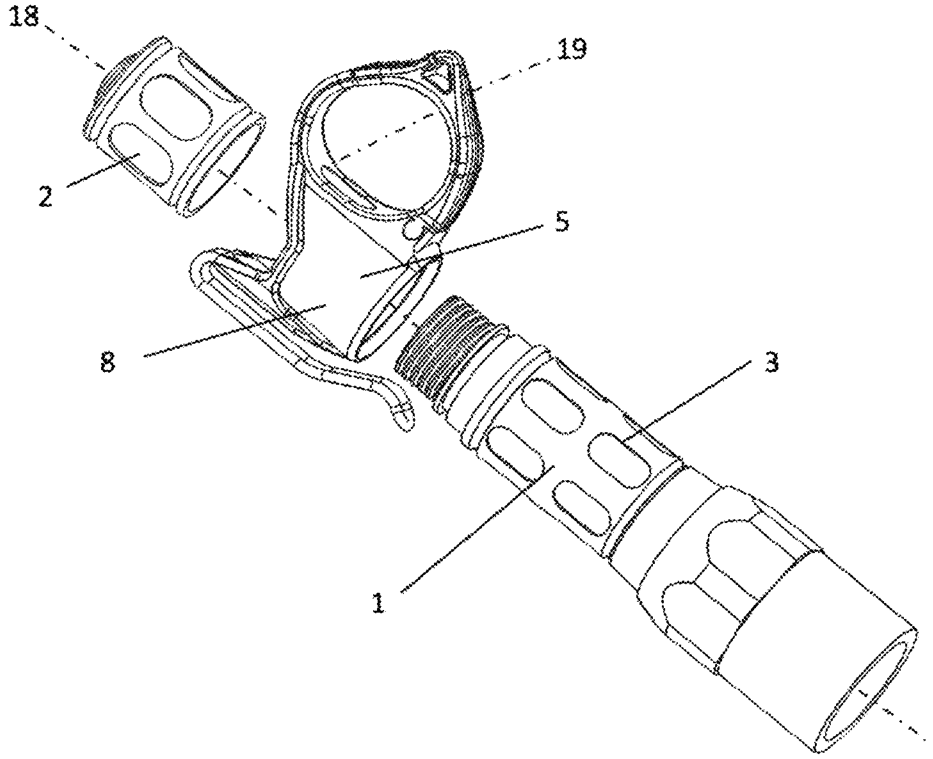
FIG. 5 is an exploded perspective view of a flashlight accessory and a flashlight according to some embodiments.

FIG. 5 shows an exploded perspective view of the flashlight accessory 5 and a flashlight 1. The flashlight accessory 5 is captured and fixed to the flashlight 1 by assembling the flashlight tail cap 2 and the flashlight tubular body 3 together with the flashlight accessory 5 in between the two. Internal protrusions within the flashlight accessory are captured by the apposing surfaces of the tailcap 2 and the tubular body 3. In other embodiments, the flashlight accessory is attached to, and or captured by, the flashlight using helical fasteners such as set screws or elastic connection collars 8 that create friction between the flashlight 1 and the flashlight accessory 5 thus holding it at a set location on the flashlight 1.

Figures 6A, 6B:
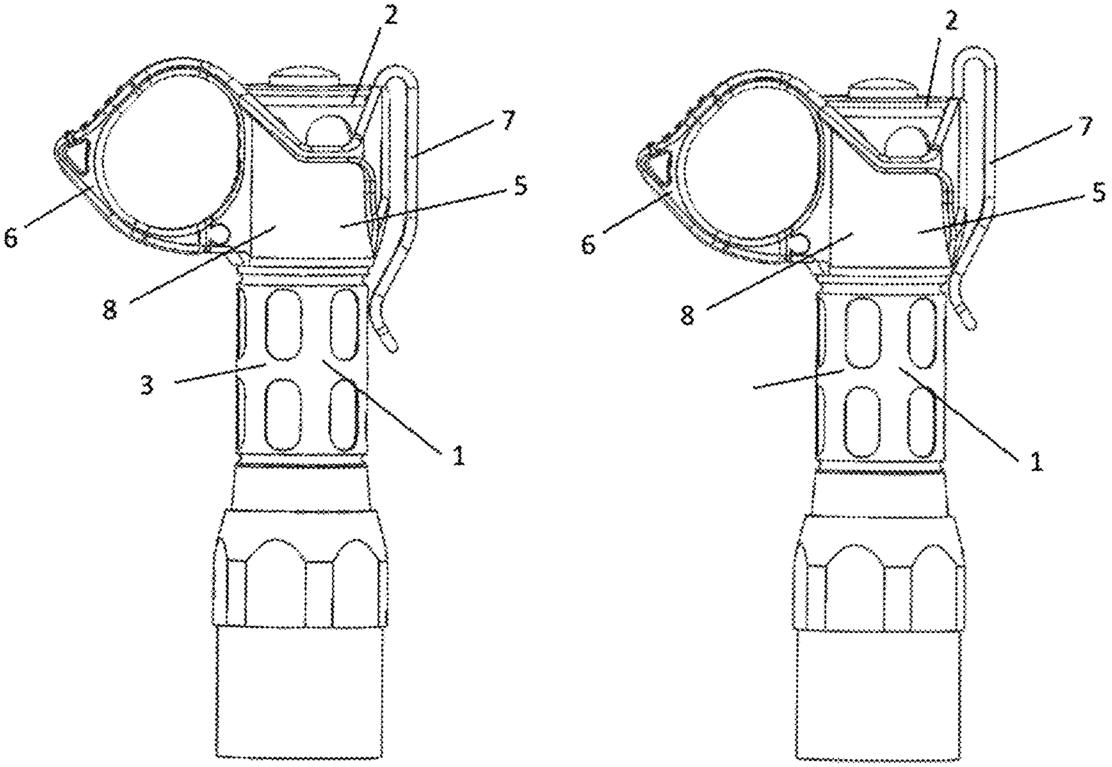
FIG. 6A is a side view of a flashlight accessory and a flashlight according to some embodiments.
FIG. 6B is a side view of a flashlight accessory and a flashlight according to some embodiments.

FIG. 6A shows a side view of the flashlight accessory 5 of FIG. 2 assembled onto a flashlight 1 per the structures mentioned above. The position of both or either the finger ring 6 and or attachment clip 7 may be designed to attach in positions relative to the flashlight 1 by changing the positions of the finger ring 6 and the attachment clip 7 relative to the connection collar 8. In FIG. 6A the adjustment clip 7 is in a lower vertical position relative to the connection collar 8. In FIG. 6B, the adjustment clip 7 is in a higher vertical position relative to the connection collar 8.

Figure 7:
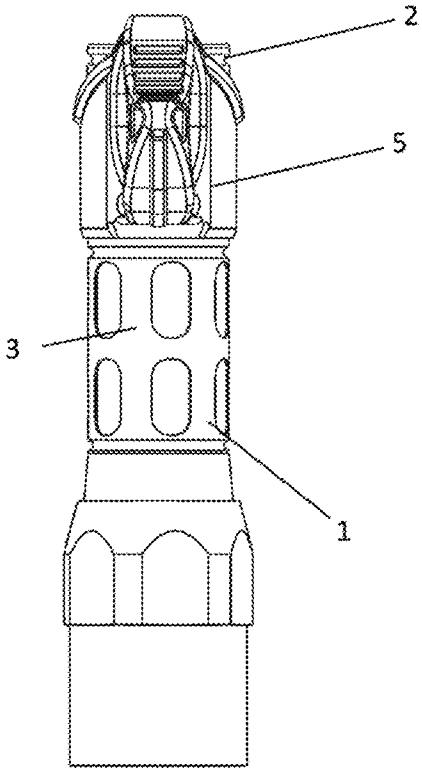
FIG. 7 is a front view of a flashlight accessory and a flashlight according to some embodiments.

FIG. 7 shows a front view of the flashlight accessory 5 of FIG. 2 and flashlight 1 for additional clarity.

Figure 8:
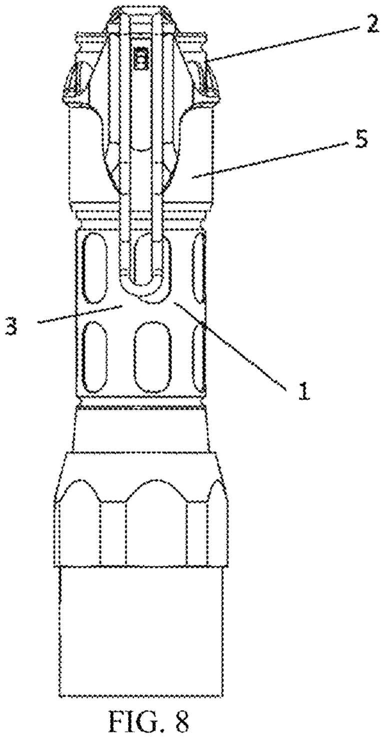
FIG. 8 is a back view of a flashlight accessory and a flashlight according to some embodiments.

FIG. 8 shows a front view of the flashlight accessory 5 of FIG. 2 and flashlight 1 for additional clarity.

Figure 11:
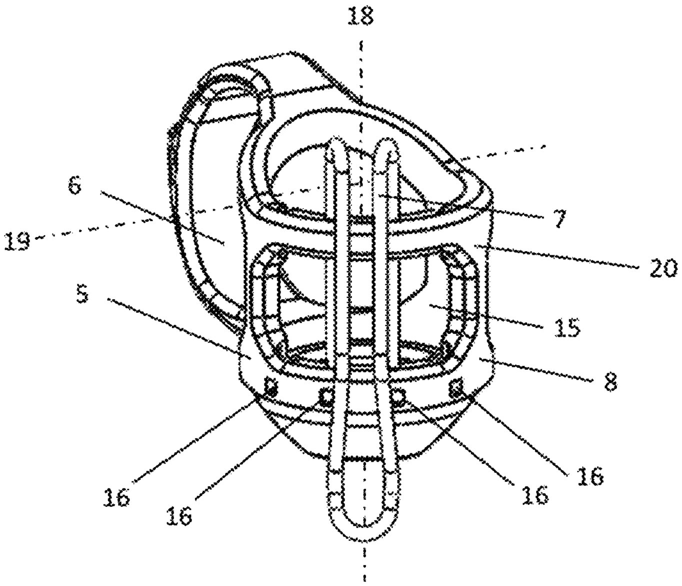
FIG. 11 is a perspective view of a flashlight accessory according to some embodiments.

FIG. 11 shows a perspective view of a flashlight accessory 5 according to another aspect comprised of a connection collar 8, an attachment clip 7, a finger ring 6. In this particular configuration, the attachment clip can be attached in multiple radial locations around the axis of the connection collar 8.

Figure 12:
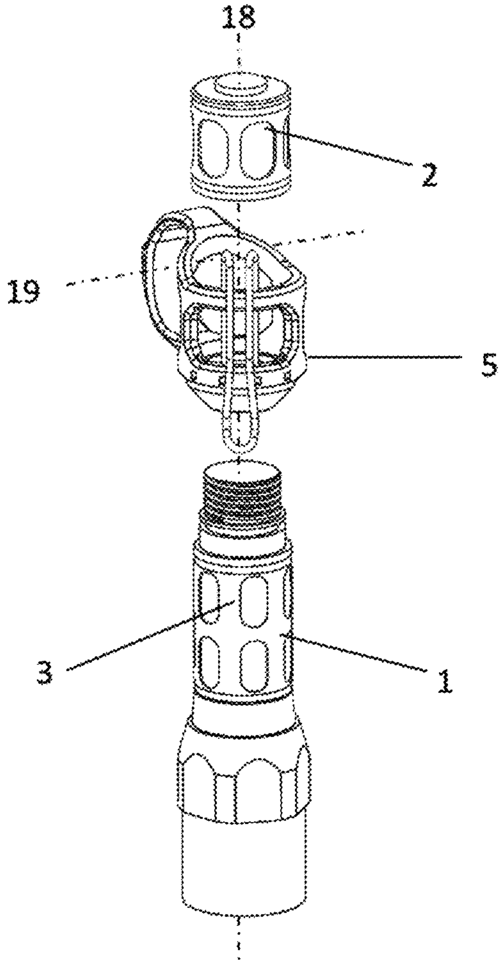
FIG. 12 is an exploded perspective view of a flashlight accessory and a flashlight according to some embodiments.

FIG. 12 shows a perspective exploded view of a flashlight accessory 5 of FIG. 11 in position to be captured by assembling a flashlight tail cap 2 and flashlight tubular body 3.

Figure 13:
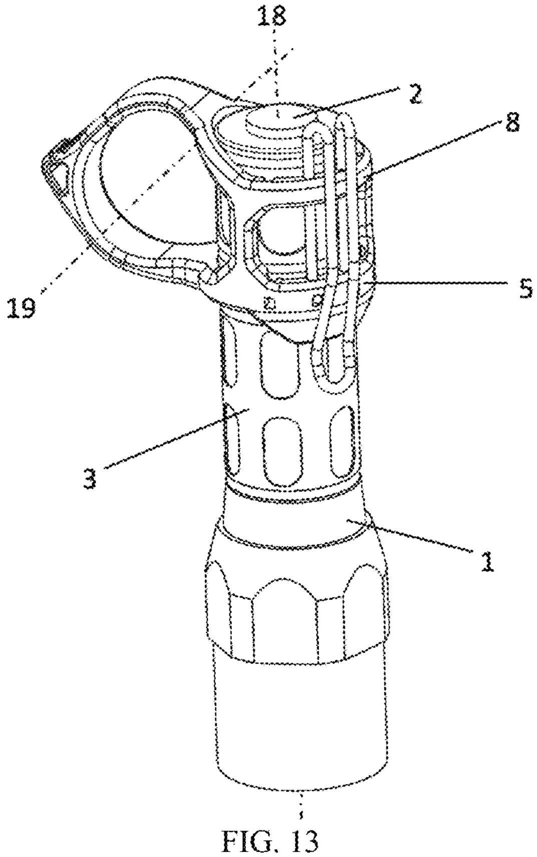
FIG. 13 is a perspective view of a flashlight accessory according to some embodiments attached to a flashlight.

FIG. 13 shows an assembled perspective view of a flashlight accessory 5 of FIG. 11 captured by assembling a flashlight tail cap 2 and flashlight tubular body 3.

Figure 14:
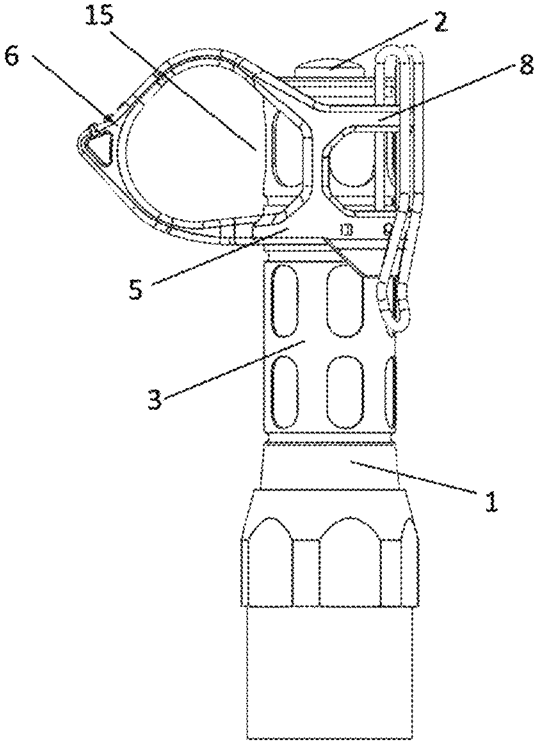
FIG. 14 is a side view of a flashlight accessory according to some embodiments attached to a flashlight.

FIG. 14 shows an assembled side view of a flashlight accessory 5 of FIG. 11 captured by assembling a flashlight tail cap 2 and flashlight tubular body 3.

Figure 15:
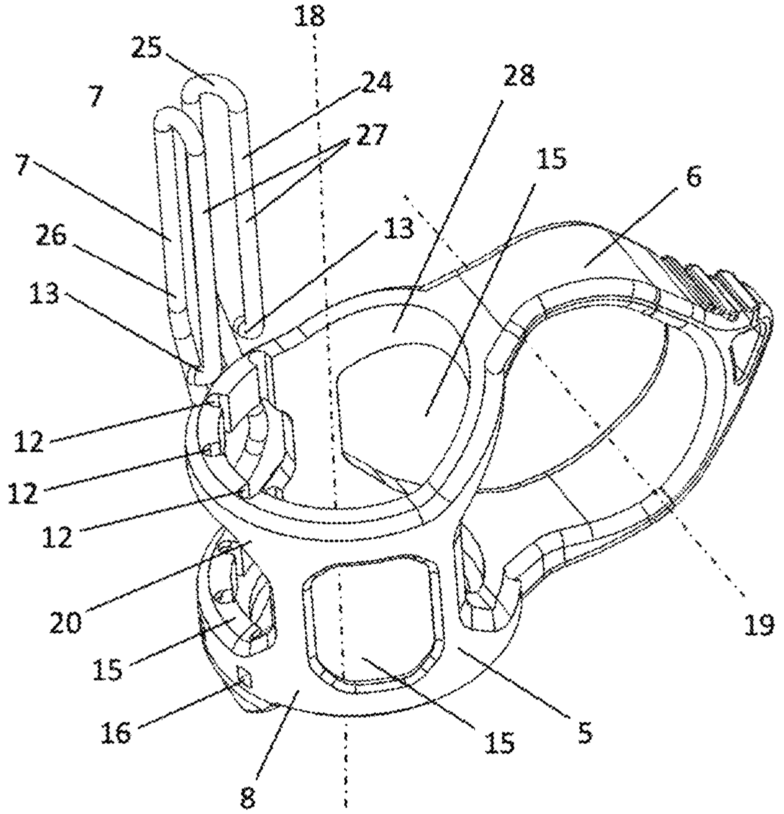
FIG. 15 is an exploded perspective view of a flashlight accessory according to some embodiments.

FIG. 15 shows an exploded perspective view of a flashlight accessory 5 of FIG. 11, but with the attachment clip if a different selected radial position. Connection collar 8 comprises a sidewall 20 having an inner surface 28. The inner surface 28 is substantially cylindrical and configured to enclose the tubular body of the flashlight when the connection collar 8 is attached to the flashlight.

A finger retention ring 6 comprises at least one member. Finger retention ring 6 is integral with or attached to an exterior of the sidewall. Finger retention ring 6 integral with or attached to the sidewall defines an opening configured to receive a first finger of at user. The central axis of the opening 19 is substantially perpendicular to a central longitudinal axis 18 of the substantially cylindrical inner surface 28 of the connection collar 8. As shown in FIG. 15, a plurality of channels 12 are formed in the connection collar sidewall 20. Each channel of the plurality of channels extends substantially in parallel with the central longitudinal axis 18 along the connection collar sidewall 20. The plurality of channels 12 are circumferentially spaced apart and disposed at different radial positions on a portion of the sidewall which is spaced apart circumferentially from the finger retention ring.

Attachment clip 7 s a radially adjustable attachment clip which is configured to be releasably mounted to any one or more of the channels 12 of the plurality of channels according to a selected radial position on the connection collar sidewall.

The attachment clip 7 includes clip protrusions 13 oriented to be engaged in connection collar holes 16 in multiple, similarly-proportioned locations such that the attachment clip 7 can be radially positioned relative to the connection collar 8 to suit the user's preference. Furthermore, the clip channels 12 additionally position portions of the attachment clip relative to the connection collar 8. In one preferred embodiment, the connection collar 8 has connection collar apertures 15 that allow access to the flashlight tailcap when assembled, and or a larger finger ring 6 internal diameter by the removal of material from the connection collar 8 closest to the finger ring 6. In further embodiments the connection collar apertures 15 may be of any number, preferably from 1-6, but may also be absent from the connection collar 8 without affecting the function and or benefits of the flashlight accessory 5.

Figure 16:
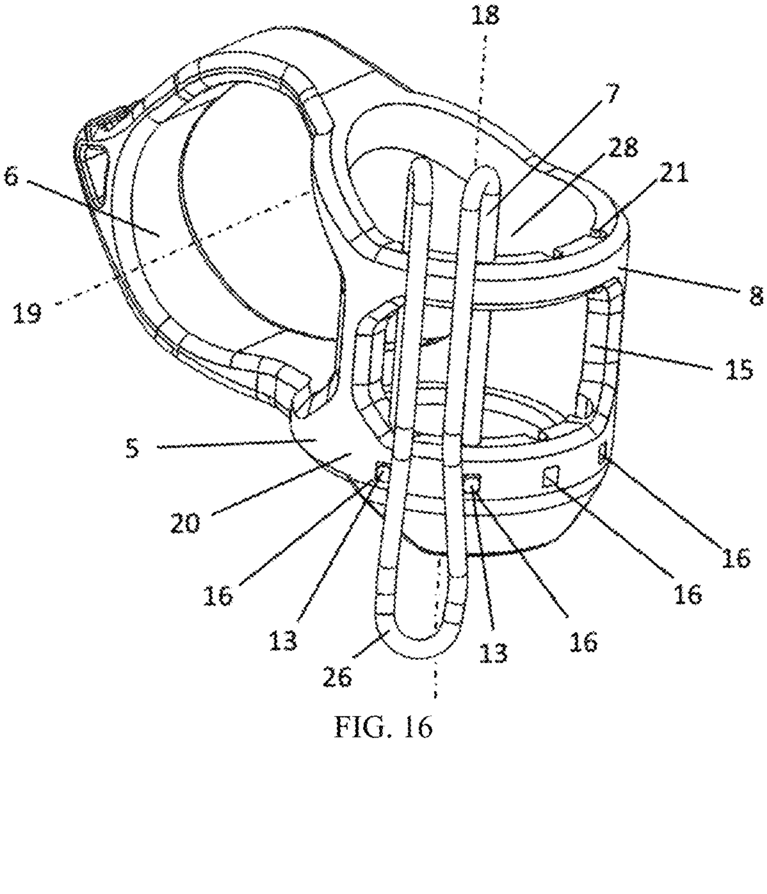
FIG. 16 is a perspective view of a flashlight accessory according to some embodiments.

Referring to the adjustable attachment clip 7 in more detail, clip 7 in some embodiments comprises a distal leg 26 interconnecting a proximal leg 24 as shown in FIGS. 15 and 16. Proximal leg 24 is configured to be slideably mounted to any one or more of the channels 12 in the selected radial position. Distal leg 26 and proximal leg 24 are operable to receive and clip therebetween an edge of a layer of material. In some embodiments, the attachment clip 7 is any one or combination of a pocket attachment clip, pouch attachment clip and a holster attachment clip, Clip 7 may be a metal wire clip and take different forms such as a wire loop clip design shown in the drawings.

Proximal leg 24 comprises a pair of spaced apart elongated members 27. An adjacent pair of channel 12*s* can serve as a pair of sub channels of single channel. The adjacent pair of channels 12 corresponding to the spaced apart elongated members 27, The spaced apart elongated members 27 are releasably mounted in the respective corresponding sub channels 12.

Each of the channels 12 of the plurality of channels has an open end 21 disposed at the upper end of the sidewall 20. The proximal leg 24 extends upwardly out from the open end of the sub channels of channel 12 to which the proximal leg is releasably mounted. Distal leg 26 and a portion interconnecting the distal leg 25 and proximal leg 24 are disposed outside the sidewall.

Proximal leg 24 has at least one protrusion 13 configured to releasably engage a corresponding at least one cavity 16 in the one or more of the channel 12 to which the proximal leg 24 is releasably mounted to retain the proximal leg in place and prevent slidable displacement of the proximal leg 24 along channel 12.

FIG. 16 shows a perspective view of a flashlight accessory 5 shown in FIG. 15. The attachment clip 7 has clip protrusions 13 that are engaged in connection collar holes 16 such that the attachment clip's 7 radial position is temporarily fixed relative to the connection collar 8. Furthermore, when this embodiment is assembled onto a flashlight 1, the flashlight tail cap 2 may provide additional structure that prevents the attachment clip from dislodging from the connection collar holes 16. In other embodiments, the attachment clip may be comprised of cut and or formed sheet metal, polymer, rubber, and other materials known to those skilled in the art. In further embodiments the radial positioning feature may be enabled by tongue and groove, slot and peg, helical fasteners, or other releasable interlocking mechanisms known to those skilled in the art.

Figures 17A, 17B:
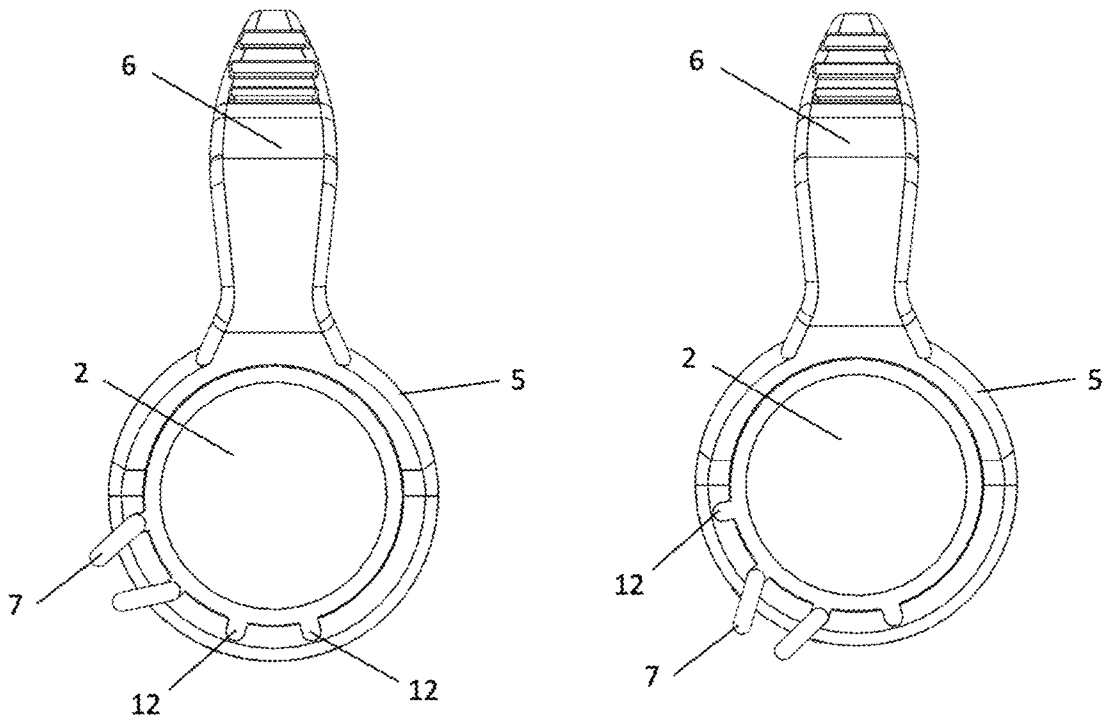
FIG. 17A is a top view of a flashlight accessory according to some embodiments.
FIG. 17B is a top view of a flashlight accessory according to some embodiments.

FIG. 17A shows a top view of a flashlight accessory 5 of FIG. 11 principally comprised of a flashlight ring 6, a connection collar 8 and an attachment clip 7 assembled onto a flashlight 1. In this particular configuration, the attachment clip is positioned in one radial position by way of the mechanisms described above. In FIG. 17B, the same flashlight accessory 5 in FIG. 17A is shown but with the attachment clip 7 in an alternate radial position by way of the mechanisms described above. Further possible configurations are available due to the number of clip channels 12 that correspond with the attachment clip's 7 structure.

Figures 18A, 18B:
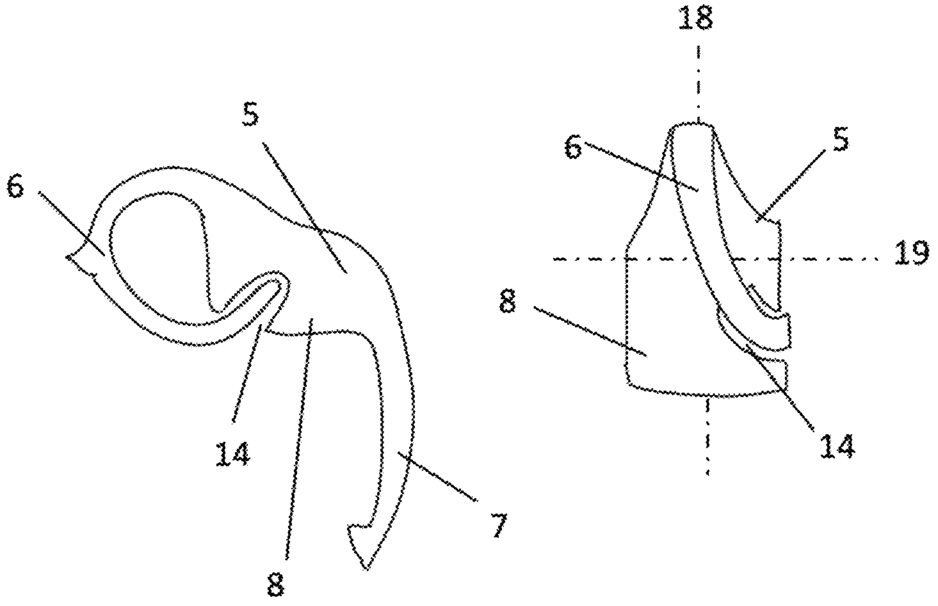
FIG. 18A is a side view of a flashlight accessory according to some embodiments.
FIG. 18B is a front view of a flashlight accessory according to some embodiments.

FIG. 18A shows a side view of a flashlight accessory according to another aspect principally comprised of an open-ended finger ring 6, a connection collar 8, and in some embodiments, an attachment clip 7. Further, the free end of the finger ring is positioned such that it is located within a clip aperture 14 located on the connection collar 8. The finger ring, due to its partially unsupported end, may be deflected away from the axis of the tubular connection collar 8. In doing so, the finger ring may be positioned on one side of an independent structure, such as the fabric of a trouser pocket while allowing the remainder of the flashlight body to remain on the other side of said trouser pocket. In some configurations the finger ring 6 acts as an attachment clip and no additional attachment clip is present. In further embodiments, the finger ring 6 may be comprised of spring steel and attached to the flashlight accessory 5 using helical fasteners, mechanical interlocking features, adhesives and/or other attachment means known to those skilled in the art.

FIG. 18B shows a front view of the flashlight accessory 5 in FIG. 18A described above.

Figures 19A, 19B:
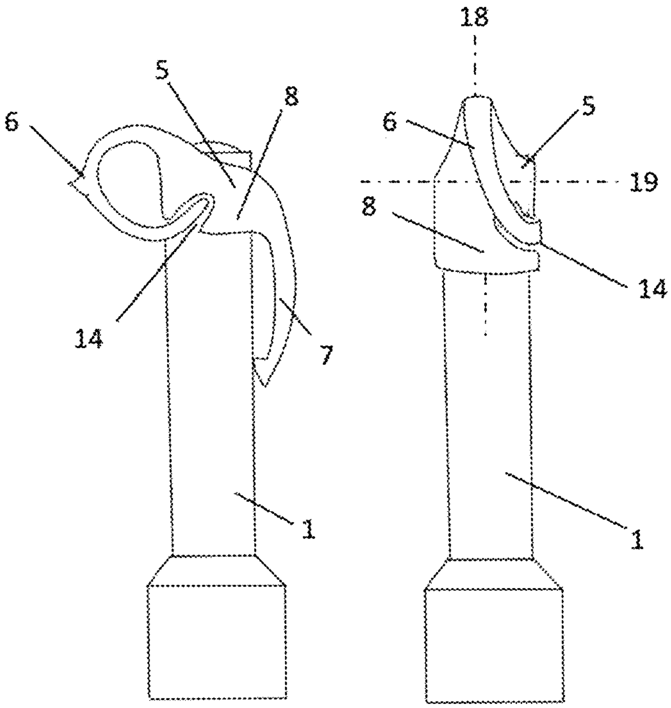
FIG. 19A is a side view of a flashlight accessory according to some embodiments attached to a flashlight.
FIG. 19B is a front view of a flashlight accessory according to some embodiments attached to a flashlight.

FIG. 19A shows a side view of a flashlight accessory 5 attached to a flashlight 1 to further illustrate the flashlight accessory shown in FIGS. 18A & 18B.

FIG. 19B shows a front view of a flashlight accessory 5 attached to a flashlight 1 to further illustrate the flashlight accessory shown in FIGS. 18A & 18B.

Figures 20A, 20B:
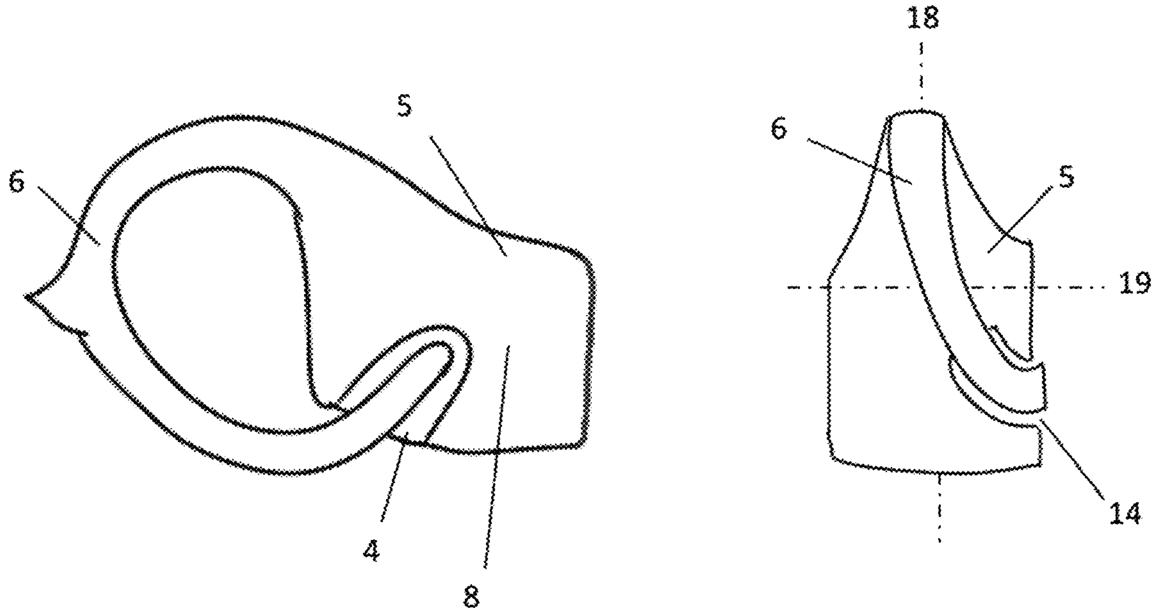
FIG. 20A is a side view of a flashlight accessory according to some embodiments.
FIG. 20B is a front view of a flashlight accessory according to some embodiments.

FIG. 20A shows a side view of a flashlight accessory 5 as described above with reference to FIGS. 18A-19B without an attachment clip 7 present. In this embodiment, the finger ring 6 may act as an attachment clip as described above and herein. FIG. 20*b* shows a front view of the same flashlight accessory in FIG. 20A for illustrative purposes.

Figure 21:
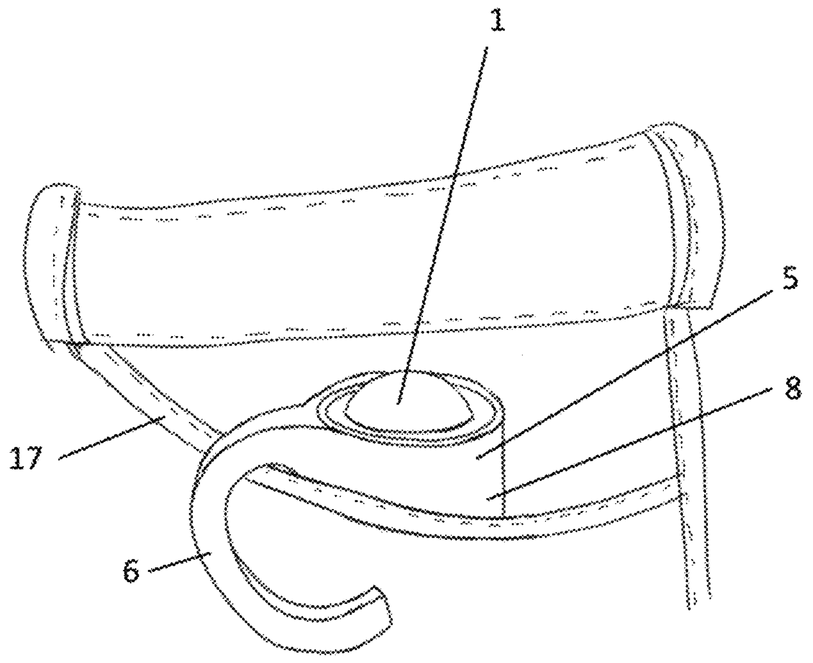
FIG. 21 is a perspective view of a flashlight and flashlight accessory according to some embodiments attached to a trouser pocket.

FIG. 21 shows the flashlight accessory 5 described above with reference to FIGS. 18A-19B or FIGS. 20A-20B to a flashlight 1 by way of a tubular attachment collar 8. In this embodiment, the finger ring 6 is temporarily deviated away from the axis of the flashlight 1 and the fabric of a trouser pocket 17 is temporarily captured between the finger ring 6 and the flashlight accessory 5 and flashlight 1. The finger ring 6's deflection provides a compressive force that acts on the trouser pocket fabric retaining the flashlight accessory 5 and flashlight 1 in place. If the user wishes to remove the flashlight accessory 5 and flashlight 1 from the trouser pocket 17, the user can insert or partially insert their finger into the ring 6 and pull the flashlight accessory 5 and flashlight 1 out of the pocket. The advantages of this design include the user being able to position their finger in the finger ring 6 during deployment from the pocket and simultaneously engaging their finger in the finger ring 6.

Figure 22:
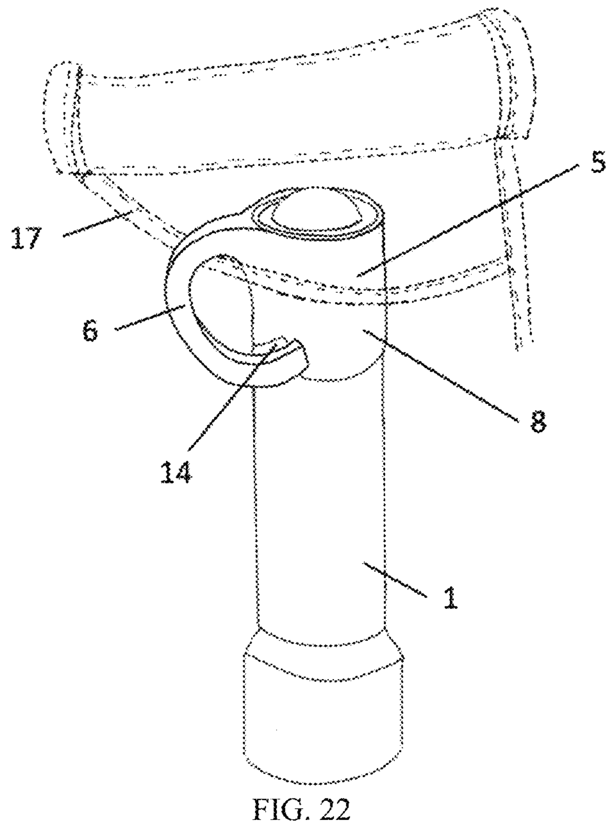
FIG. 22 is a perspective view of a flashlight and flashlight accessory according to some embodiments attached to a trouser pocket.

FIG. 22 shows an additional view of the flashlight accessory 5 and flashlight 1 shown in FIG. 21 temporarily attached to a trouser pocket as described above.

Figure 23:
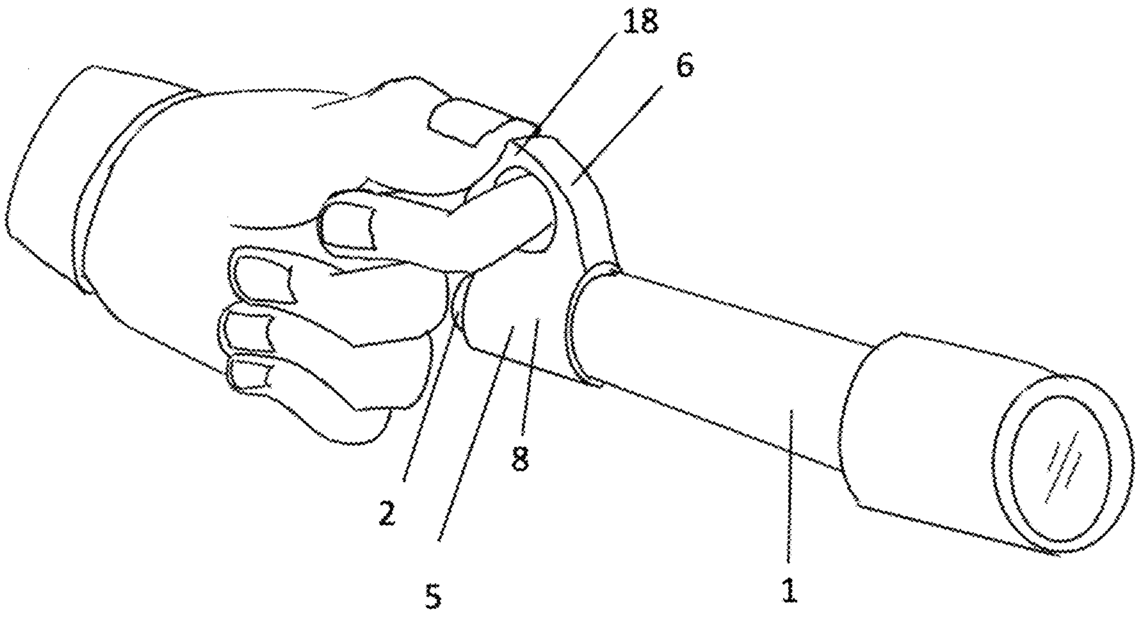
FIG. 23 is a perspective view of a human hand holding a flashlight and flashlight accessory according to some embodiments.

FIG. 23 shows a hand holding the flashlight accessory 5 attached to a flashlight 1 in an orientation such that the user's first (index) finger is engaged in the finger ring 6 and the thumb is pressing against a ring protrusion 18. When the ring protrusion 18 is pressed by the thumb, the flashlight 1 and flashlight accessory 5 rotate around the user's first (index) finger and cause the tailcap switch 2 to be depressed by the second finger of the user. This method of holding of retaining and activating the flashlight provides unique advantages to the user including but not limited to allowing the remaining fingers to form a grip on another object such as a firearm. It will be appreciated that the flashlight accessory 5 shown in FIG. 23 may be any one of the embodiments of the flashlight accessory described herein.

All of the various features described in the above embodiments may be integrated permanently into a flashlight itself.

Some embodiments of the present technology may include combinations of the features described above including but not limited to a flashlight accessory 5 with a finger ring 6, an attachment clip 7, and a design allowing adjustability of both or either vertical or radial attachment clip positions. In any one of the embodiments of the flashlight accessory described herein, the central axis 19 of the opening is substantially perpendicular to a central longitudinal axis 18 of the cylindrical inner surface of connection collar 8 to the extent that is sufficient to allow a user to handle and operate the flashlight accessory as described herein when the flashlight accessory is attached to a flash light.

Some embodiments of the present technology are comprised of metal materials. Some embodiments of the invention are comprised of polymer materials. Furthermore, some embodiments of the present technology are comprised of a combination of metals, polymers, and other materials as known to those skilled in the art.

Some embodiments may include bi-material polymer material combinations, commonly known as over-molding. In such embodiments a softer material may be injection molded onto a more rigid material to provide the material properties of both materials within the invention.

Although the present technology has been disclosed in the context of certain preferred embodiments and examples, it will be understood by those skilled in the art that the present technology extends beyond the specifically disclosed embodiments to other alternative embodiments and/or uses of the present technology and obvious modifications and equivalents thereof. Thus, it is intended that the scope of the present technology herein disclosed should not be limited by the particular disclosed embodiments described above, but should be determined only by a fair reading of the claims once provided.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims, once provided, be regarded as including such equivalent constructions insofar as they do not depart from the spirit and scope of the present technology.

It is another object of the present technology of at least one embodiment to provide a new and novel flashlight accessories that may be easily and efficiently manufactured and marketed.

An even further object of the present technology of at least one embodiment is to provide a new and novel flashlight accessories that has a low cost of manufacture with regard to both materials and labor, and which accordingly is then susceptible of low prices of sale to the consuming public, thereby making such flashlight accessories economically available to the buying public.

Still another object of the present technology of at least one embodiment to provide a new flashlight accessories that provide in the apparatuses and methods of known technology some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

While embodiments of the flashlight accessories have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although flashlight accessories have been described, it should be appreciated that the present technology herein described is also suitable for enhancing any flashlight.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed is:

1. A flashlight accessory for a flashlight, the flashlight accessory comprising:

a connection collar comprising a sidewall having an inner surface, wherein the inner surface is substantially cylindrical and configured to enclose a tubular body of the flashlight when the connection collar is attached to the flashlight;

a finger retention ring comprising at least one member, wherein the finger retention ring is integral with or attached to an exterior of the sidewall, wherein the finger retention ring integral with or attached to the exterior of the sidewall defines an opening configured to receive a first finger of a user, wherein a central axis of the opening is substantially perpendicular to a central longitudinal axis of the substantially cylindrical inner surface of the connection collar;

an attachment clip disposed on the sidewall, the attachment clip being spaced apart circumferentially around the sidewall from the finger retention ring, wherein the attachment clip is configured to be slideably mounted in different positions along the sidewall, the attachment clip being configured to be slidable substantially parallel with the central longitudinal axis of the substantially cylindrical inner surface and to be securable in each of the different positions.

2. The flashlight accessory of claim 1, wherein the attachment clip comprises a distal leg interconnecting a proximal leg, the proximal leg being slidably mounted along the sidewall and configured to be securable in the different positions along the sidewall, and wherein, the distal leg and proximal leg are operable to receive and clip therebetween an edge of a layer of material.

3. The flashlight accessory of claim 2, wherein the attachment clip is any one or combination of a pocket attachment clip, pouch attachment clip and a holster attachment clip.

4. The flashlight accessory of claim 3, wherein the proximal leg is slidably mounted in at least one channel disposed along the connection collar sidewall, the at least one channel extending substantially parallel with the central longitudinal axis of the substantially cylindrical inner surface.

5. The flashlight accessory of claim, 4 wherein the proximal leg is configured to be slideably friction fit to the at least one channel.

6. The flashlight accessory of claim 5, wherein the proximal leg includes at least one protrusion/recess and the at least one channel includes at least one corresponding recess/protrusion, wherein the protrusion/recess of the proximal leg and the corresponding protrusion/recess of the at least one channel are configured to limit the range of slidable displacement of the proximal leg along the at least one channel.

7. The flashlight accessory of claim 6, wherein the at least one channel has an open end disposed at the upper end of the sidewall, wherein the proximal leg is disposed in the open end, and wherein the distal leg and a portion interconnecting the distal leg and proximal leg are disposed outside the sidewall.

8. The flashlight accessory of claim 7, wherein the attachment clip is configured to slideably translate on the sidewall between an upper vertical position and a lower vertical position, wherein when the attachment clip is in the upper vertical position the proximal leg extends upwardly out from and beyond the open end of the channel and wherein when the attachment clip is in the lower vertical position, the proximal leg is disposed further downward in the channel.

9. The flashlight accessory of claim 6, wherein the proximal leg has a distal end disposed in the channel in a lower region opposite the open end, the lower region being wider than a portion of the channel above the lower region, wherein the protrusion is disposed on the distal end; wherein the protrusion is configured to abut a closed end of the channel opposite the open end when the attachment clip is in the lower vertical position, and abut a top sidewall of the lower region of the channel when the attached clip is in the upper position.

10. A flashlight accessory comprising:

a connection collar comprising a sidewall having an inner surface, wherein the inner surface is substantially cylindrical and configured to enclose a tubular body of a flashlight when the connection collar is attached to the flashlight;

a finger retention ring comprising at least one member, wherein the finger retention ring is integral with or attached to an exterior of the sidewall, wherein the finger retention ring integral with or attached to the sidewall defines an opening configured to receive a first finger of at user, wherein a central axis of the opening is substantially perpendicular to a central longitudinal axis of the substantially cylindrical inner surface of the connection collar;

a plurality of channels, each channel of the plurality of channels extending substantially in parallel with the central longitudinal axis along the sidewall, the plurality of channels being circumferentially spaced apart and disposed at different radial positions on at least a portion of the sidewall, the portion of the sidewall being spaced apart circumferentially from the inner retention ring; and a radially adjustable attachment clip, wherein the attachment clip is configured to be releasably mounted to any one or more of the channels of the plurality of channels according to a selected radial position on the sidewall.

11. The flashlight accessory of claim 10, wherein the adjustable attachment clip comprises a distal leg interconnecting a proximal leg, the proximal leg being configured to be selectively mounted to any one or more of the channels to radially position the proximal leg on the sidewall and wherein the distal leg and proximal leg are operable to receive and clip therebetween an edge of a layer of material.

12. The flashlight accessory of claim 11, wherein the attachment clip is any one or combination of a pocket attachment clip, pouch attachment clip and a holster attachment clip.

13. The flashlight accessory of claim 12, wherein the proximal leg is configured to releasably friction fit to the one or more channels in the selected radial position.

14. The flashlight of claim 13, wherein proximal leg comprises a pair of spaced apart elongated members, wherein the one or more channels comprises a pair of sub channels corresponding to the spaced apart elongated members, and wherein the spaced apart elongated members are releasably mounted in the respective corresponding sub channels.

15. The flashlight accessory of claim 11, wherein each of the channels of the plurality of channels has an open end disposed at the upper end of the sidewall, wherein the proximal leg extends upwardly out from the open end of the one or more channels to which the proximal leg is releasably mounted, and wherein the distal leg and a portion interconnecting the distal leg and proximal leg are disposed outside the sidewall.

16. The flashlight accessory of claim 15, wherein the proximal leg has at least one protrusion configured to releasably engage a corresponding at least one cavity in the one more or channels to which the proximal leg is releasably mounted to prevent slidable displacement of the proximal leg in the one or more channels.

17. A flashlight accessory comprising a connection collar comprising a sidewall having an inner surface, wherein the inner surface is substantially cylindrical and configured to enclose a tubular body of a flashlight when the connection collar is attached to the flashlight;

a finger retention ring, wherein the finger retention ring is integral with or attached to an exterior of the connection collar sidewall, wherein the finger retention ring includes a flexible semi rigid member, the flexible semi rigid member including an end integrated or attached to the sidewall and a distal end opposite the end integrated or attached to the sidewall; wherein the flexible semi rigid member is configured to be adjustable between a ring configuration and a clip configuration, wherein in a ring configuration the distal end of the flexible semi rigid member is releasably engaged with the sidewall and the flexible semi rigid member is substantially ring shaped and together with the sidewall defines the opening; wherein the opening is substantially perpendicular to a central longitudinal axis of the substantially cylindrical inner surface of the sidewall; and, wherein in a clip configuration, the distal end is detached and spaced from the sidewall, the sidewall and distal end being configured to receive and clip therebetween an edge of a layer of material.

18. The flashlight accessory of claim 17, further comprising a recess in the exterior of the sidewall of the connection collar, and wherein, in the ring configuration, the distal end is configured to engage loosely in the recess.

19. The flashlight accessory of claim 18, wherein the distal end of the flexible semi rigid member is configured to temporarily deflect away from the sidewall when the distal end is released from the recess.

20. The flashlight accessory of claim 19, wherein the plane occupied by the recess is offset from the plane occupied by the opposite end of the flexible member, wherein in the ring configuration the flexible member curves between the plane occupied by the opposite end and the plane occupied by the recess and the distal end.

* * * * *